United States Patent
Potter et al.

(10) Patent No.: US 6,375,843 B1
(45) Date of Patent: Apr. 23, 2002

(54) APPARATUS AND PROCESS FOR THE SEPARATION OF LIQUIDS AND SOLIDS

(75) Inventors: J. Leon Potter; Ross D. Roberts, Jr., both of Houston, TX (US)

(73) Assignee: Environmental Safeguards, Inc., Houston, TX (US)

( * ) Notice: Subject to any disclaimer, the term of this patent is extended or adjusted under 35 U.S.C. 154(b) by 0 days.

(21) Appl. No.: 09/517,842

(22) Filed: Mar. 2, 2000

Related U.S. Application Data

(63) Continuation of application No. 09/015,167, filed on Jan. 29, 1998, now abandoned.

(51) Int. Cl.$^7$ ............................................... B01D 17/02
(52) U.S. Cl. .................. 210/323.2; 210/195.1; 210/321.72; 210/321.79; 210/321.8; 210/416.5; 210/497.01; 210/500.25; 210/506; 210/510.1; 210/513; 210/799; 210/804; 210/805
(58) Field of Search ................... 210/321.78, 321.79, 210/321.8, 321.88, 323.2, 483, 498, 497.01, 500.25, 510.1, 194, 195.1, 195.2, 321.72, 416.1, 416.5, 506, 513, 799, 804, 805

(56) References Cited

U.S. PATENT DOCUMENTS

| | | | |
|---|---|---|---|
| 4,888,114 A | * | 12/1989 | Gaddis et al. |
| 5,840,186 A | * | 11/1998 | MacAlpine et al. ... 210/321.79 |
| 6,110,390 A | * | 8/2000 | Potter et al. ................. 210/799 |

OTHER PUBLICATIONS

Graver Separations Brochure: "Scepter Stailess Steel Membrane Systems" © 1996 Graver Chemical Company.*

* cited by examiner

Primary Examiner—Robert J. Popovics
(74) Attorney, Agent, or Firm—Kenneth H. Johnson

(57) ABSTRACT

A liquid solid separation apparatus having a porous metal pipe sealed inside a non-porous metal pipe which allows a portion of the liquids, e.g., hydrocarbons and water to pass through the first pipe into the non porous pipe from which they are removed while solids are retained within the porous pipe. In the process there is a system pressure which aids in the filtration and a circulating velocity which removes the detained solids. Preferably a portion of these solids with reduced liquid content are recycled back to the system, mixed with fresh feed. By recycling a porion of the recovered solid concentrate the velocity of the flow in the system kept constant and the system itself is stabilized.

4 Claims, 3 Drawing Sheets

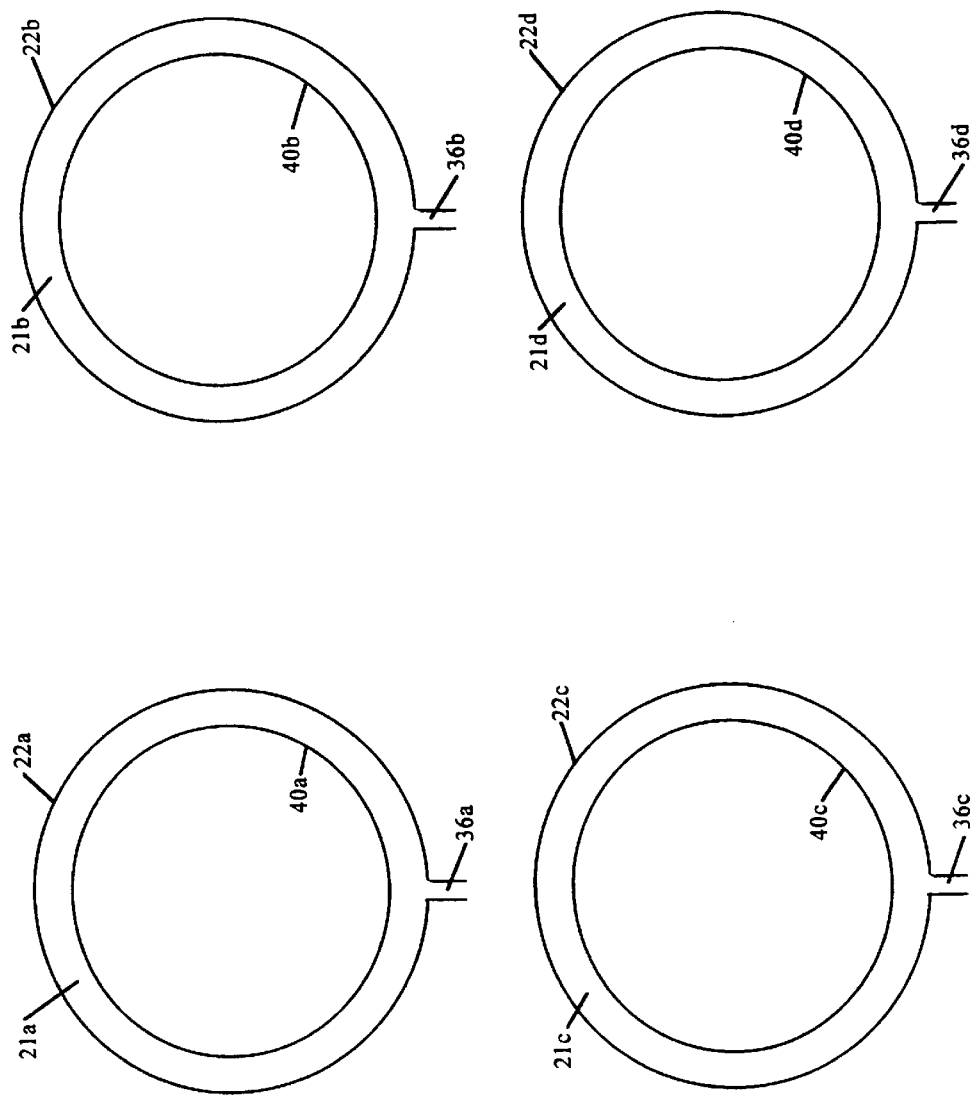

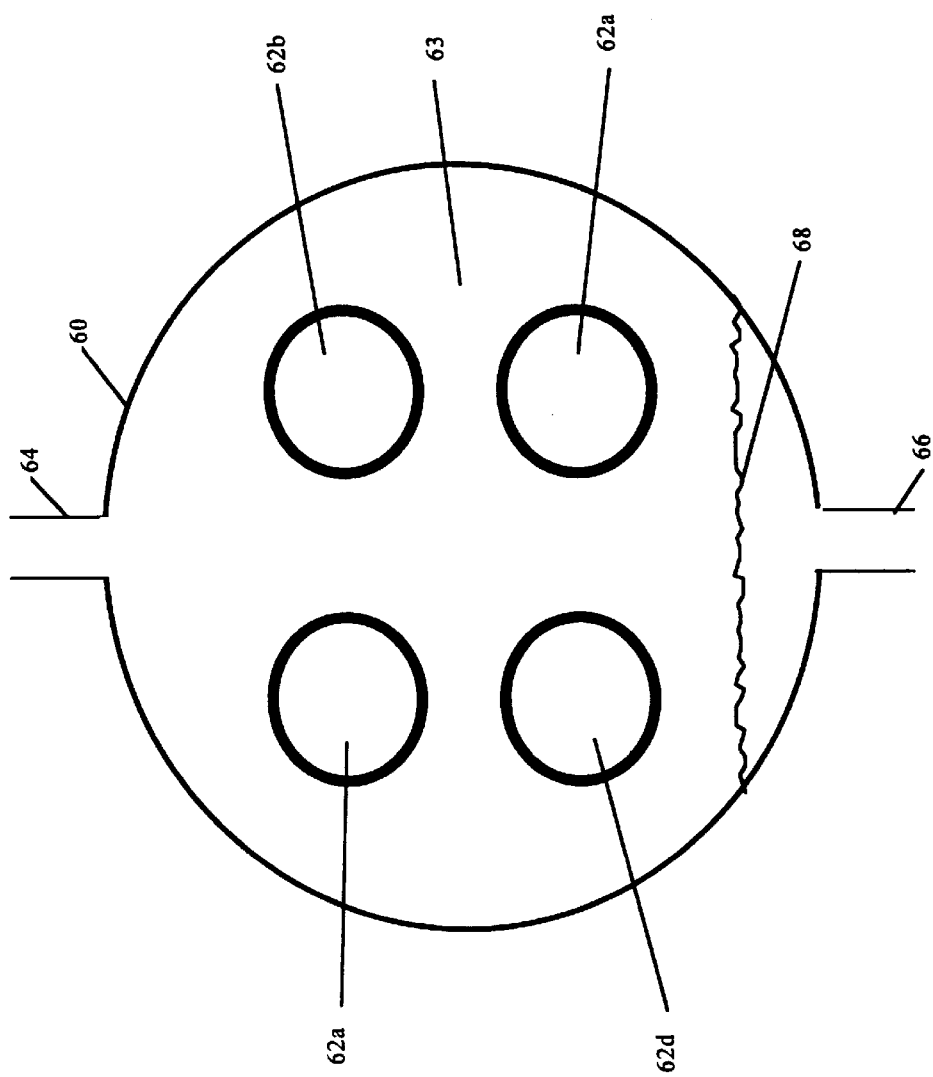

APPARATUS AND PROCESS FOR THE SEPARATION OF LIQUIDS AND SOLIDS

This is a continuation, of application Ser. No. 09/015,167, filed Jan. 29, 1998 now abandoned.

BACKGROUND OF THE INVENTION

1. Field of the Invention

The present invention relates to an apparatus and process for separating solids, particularly small particulates such as fines from hydrocarbon/water mixtures and in the further separation of hydrocarbon and water.

2. Related Art

Some hydrocarbon streams are contaminated with particulate solids. For example, hydrocarbons recovered in soil reclamation under the super fund proceedings. Other examples of hydrocarbon streams which may be contaminated with particulate solids are those recovered in remediation of drilling muds, spent motor oils and the like. Shale oil and oil sand hydrocarbons may also contain small solid particles.

The solid particles are usually in the range of 0.1 micron up to 20 and are not easily separated by gravity settling but tend to stay suspended in the hydrocarbons.

SUMMARY OF THE INVENTION

The present invention provides an apparatus and process for separating particulate solids from hydrocarbon stream in a continuous process by pressure filtration of the liquids and cross flow removal of the separated solids from the filter medium.

Briefly, the present apparatus uses a porous metal pipe sealed inside a non-porous metal pipe which allows the liquids, e.g., hydrocarbons and water to pass from the first pipe in to the second pipe from which they are removed while solids are retained within the first pipe. There is a system pressure which aids in the filtration and a circulating flow which removes the detained solids and preferably recycle a portion of these solids (having greatly reduced liquids content) with fresh feed back to the system.

The cross flow of the circulating flow prevents buildup of the filtered solids. The hydrocarbons are removed from the chamber formed by the outer pipe. If water is present, the hydrocarbons and water are separated in the outer pipe chamber by decanting, for example, with a bottom drain for the water and an upper drain for the hydrocarbons.

The term hydrocarbons as used herein includes other organic compounds such as nitrogen, oxygen, sulfur or metal containing organic compounds frequently associated with hydrocarbons.

BRIEF DESCRIPTION OF THE DRAWINGS

FIG. 2 is a cross section taken along line 2—2 of FIG. 1.

FIG. 3 is a cross sectional representation of a multiple porous tube configuration.

DETAILED DESCRIPTION

Figure 1:
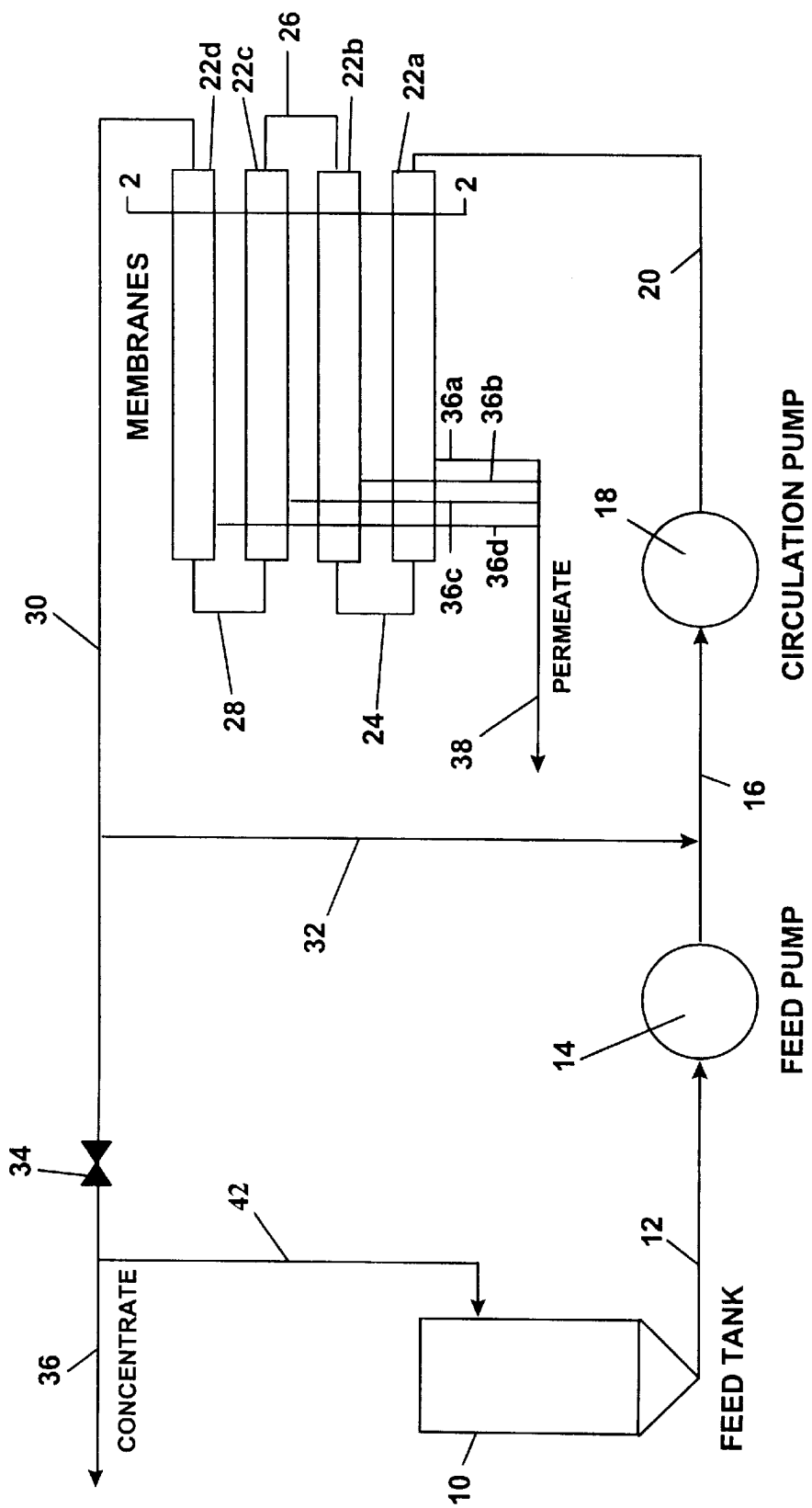
FIG. 1 is a schematic representation of one embodiment of the present invention.

Generally, the porous metal component is formed from non-spherical particles which have an irregular shape. These metal particles should have a particle size from 30 to 100 micrometers with from 30 to 40 micrometers being the preferred range. The porous metal component should have pore sizes from 0.5 to 10 micrometers with from 0.5 to 5 micrometers being the preferred range. Generally the porous metal component will have a porosity of 5 to 20% prior to treatment with the metal oxide.

The porous metal component should be formed of a metal which is not corroded by the fluids with which it is intended to be used. Generally austenitic stainless steels are preferred. The particularly preferred stainless steels are the 300 series with 316L being especially preferred.

Preferably the porous metal component in the form of a tube or pipe is coated on the internal surface with a sintered metal oxide.

The metal oxide particles are generally spherical in shape and have a particle size of from 0.2 to 1.0 micrometer. The metal oxide should be sinterable at a temperature below the melting point of the metal used to form the support. Generally the metal oxide should coalesce at below 1200° C. with from 900° to 1200° C. being the preferred range. The preferred metal oxide is titania. The anatase crystalline form of titania which is converted to the rutile crystalline form upon being heated and sintered together has given particularly good results. For titania the sintering temperature should be from 900° to 1200° C. with from 1050° to 1200° C. being preferred.

Preferably the particles removed are larger than about 0.05 micron, preferably about 0.1 micron or larger. Solids larger than about 10 may be more easily removed by other means.

The system is preferably pressured to operate at 10–600 psi. The temperature of the treated materials is adjusted to facilitate the passage of the hydrocarbon through the pores of the substrate and any metal oxide coating by reducing the viscosity. Temperatures in the range of 60–300° F. are preferred. The pressure and temperature can be adjusted relative to each other to obtain optimum flow.

An important aspect of the process is the velocity of the material through the inner tube(s) or pipe(s). High velocity removes the solids from the porous metal tube wall and prevents plugging of the pores. The velocity of the feed and recirculation material is that sufficient to remove the solids from the inner tubes(s) or pipe(s), preferably about 10 to 20 feet per second. The preferred velocity is 15 feet per second of the material in the system, i.e., fresh feed and recirculated material passing through the porous inner tube(s) or pipe(s). Feed rate of material to the circulating system may range from 1 to 2100 gallons per minute.

The apparatus is comprised of one or more, preferably multiple, porous metal tubes and more preferably a plurality of such tubes running through and enclosed by a non-porous container, e.g., a larger pipe which forms a chamber to receive the filtered liquid.

A preferred system is comprised of one or more stainless steel tubes 6–75 mm in diameter with a $TiO_2$ coating sintered to the inside diameter Typically the tubes are welded together into an all stainless steel membrane module. One or more modules may be connected in series or parallel.

The hydrocarbon feed material may contain water in addition to the solid particles. Up to 25 vol. % water may be present in the fresh feed.

Referring now to FIG. 1 a particular embodiment is illustrated as a schematic flow diagram. A hydrocarbon material containing particulate solids preferably in the range of 0.1 to 20 microns is accumulated in a feed tank 10 from which it passes via line 12 to feed pump 14 which serves to pressurize and supply feed to the system. From the feed pump the pressurized feed passes via line 16 to circulation pump 18 which maintains the velocity of the material flowing through the separating zone. The feed enters the separating zone through line 20. In this embodiment the separating zone is comprised of multiple sections, 22a, 22b, 22c and 22d, arranged in series. section 22a, the hydrocarbon feed flows through porous metal tube 40a, where a portion of the liquids in the feed (hydrocarbons and optionally up to about 0–25 vol percent water) pass through porous tube 40a into the chamber 21a formed by tube 22a surrounding porous tube 40a. The porous tube must be enclosed by an outer non-porous tube or some equivalent structure to create a chamber to receive the permeated liquid. The permeated liquid is collected in the chamber 21a and exits via line 36a.

In a similar manner the feed stream flows out of section 22a through regular non-porous conduit 24 into section 22b where a further portion of the liquid permeates porous metal tube 40b into chamber 21b from which it passes via line 36b. From section 22b via line 26 the feed stream passes to section 22c where a further portion of the liquid permeates porous metal tube 40c, is collected in chamber 21c and removed via line 36c. The material in section 22c passes via non-porous tube 28 to section 22d where a final portion of the feed liquid passes into chamber 21d and is removed via line 36d. Each permeate removal line feeds to a single line 38 for recovery.

The solid concentrate exits the treatment separating zone via line 30 from which it may be removed from the system through valve 34 and line 36 or all or a portion may be returned to the hydrocarbon feed to the separation zone. Alternatively the recycled concentrate may be returned to the feed tank via line 42. The recycle concentrate is considered as feed component for determining the necessary feed velocity through the system and is used to keep the feed at a constant solids density above the source hydrocarbon, thereby optimizing the system and allowing constant operating conditions for the most economic and effective operation. Any number of porous metal tubes may be positioned within a chamber and any number of sections may be arranged in series in the apparatus to achieve the degree of separation desired.

The concentrate may be used as bunker fuel or in the case of a hydrocarbon source derived from a remediation system, the concentrate may be returned to the remediation system. If the permeate recovered via line 38 contains water, the stream may be sent to a distillation unit (not shown) or decanter (not shown) to separate water and hydrocarbons.

FIG. 3 illustrates an embodiment which is particularly useful for hydrocarbon/water/solid streams. There are four porous metal tubes, 60a–60d, positioned within non-porous tube 60 either in a system as shown in FIG. 1 or other configuration. The hydrocarbon and water permeate the porous tubes and water is removed via line 66 while hydrocarbons are removed from chamber 63 via line 64.

EXAMPLE

The source feed was derived from a hydrocarbon vapor recovery system used to purify vapor from a drilling mud remediation in which diesel boiling range material used as a component of the drilling mud. The source hydrocarbon feed had the characteristics shown in the TABLE.

TABLE

| Hydrocarbons | 85 Vol. % |
| Water | 5 Vol. % |
| Solids | 10 Vol. % |

Particle size range .1 to 20 microns

In an apparatus arranged similarly to that illustrated in FIG. 1, the source feed was pumped from the feed tank into the separation zone at a pressure of 25–300 psig, temperature of 150° F. and at a rate of 5–10 gpm. Each section of the separation zone comprises four 5 ft. long, ½ inch ID stainless having titanium dioxide internal coating and positioned centrally as shown in FIG. 3 and sealed inside a 5 ft. long, 2 ½ ID stainless steel pipe. A portion of the solid concentrate was recycled to the feed line, as required, to maintain the system velocity.

The invention claimed is:

1. An apparatus comprising:

a non-porous tube, at least one porous metal tube comprising stainless steel, having a pore size in the range of 0.5 to 10 micrometers, being coated internally with sintered metal oxide, positioned in said non-porous tube, and sealed within said non-porous tube, said non-porous tube having an upper portion and a lower portion;

at least one line for continuous use to remove a first liquid from the apparatus and connected to the upper portion of said non-porous tube;

at least one line for continuous use to remove a second liquid from the apparatus and connected to the lower portion of said non-porous tube;

a feed line connected to said tubular porous metal tube, a solids removal line connected to porous metal tube distal to feed line;

a circulating cross flow pump operably positioned on the feed line;

a feed tank upstream of said cross flow pump and connected to said feed line; and a second pump in said feed line to pressurize the feed, said solids removal tube being connected to said feed tank.

2. The apparatus according to claim 1 wherein said metal oxide comprises titanium oxide.

3. The apparatus according to claim 4 wherein said pore size of said combined porous metal tube and sintered titanium oxide is in the range of about 0.5 to about 0.01 microns.

4. The apparatus according to claim 1 wherein said pore size of said porous metal is in the range of 0.5 to 5 micrometers.

* * * * *